United States Patent
Park et al.

(10) Patent No.: US 9,461,785 B2
(45) Date of Patent: Oct. 4, 2016

(54) CONTROL SIGNALING METHOD AND APPARATUS IN A COORDINATED MULTI-POINT SYSTEM

(75) Inventors: Min-Kyoung Park, Suwon-si (KR); Hun-Kee Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 204 days.

(21) Appl. No.: 13/583,203

(22) PCT Filed: Mar. 11, 2011

(86) PCT No.: PCT/KR2011/001728
§ 371 (c)(1),
(2), (4) Date: Sep. 6, 2012

(87) PCT Pub. No.: WO2011/112044
PCT Pub. Date: Sep. 15, 2011

(65) Prior Publication Data
US 2012/0327904 A1    Dec. 27, 2012

(30) Foreign Application Priority Data
Mar. 12, 2010 (KR) .................. 10-2010-0022328

(51) Int. Cl.
*H04W 36/00*   (2009.01)
*H04L 5/00*    (2006.01)
(Continued)

(52) U.S. Cl.
CPC ............. *H04L 5/0007* (2013.01); *H04B 7/024* (2013.01); *H04L 5/0035* (2013.01); *H04L 5/0092* (2013.01); *H04W 36/0055* (2013.01); *H04W 36/08* (2013.01); *H04W 48/08* (2013.01); *H04W 88/08* (2013.01)

(58) Field of Classification Search
CPC ...... H04W 36/00; H04W 64/00; H04B 1/69; H04L 1/00; H04L 1/16; H04L 1/18; H04L 25/03
See application file for complete search history.

(56) References Cited

U.S. PATENT DOCUMENTS

2003/0083070 A1*  5/2003  Ishikawa et al. ............. 455/436
2010/0190447 A1*  7/2010  Agrawal et al. ............. 455/63.1
(Continued)

OTHER PUBLICATIONS

International Searching Report and Written Opinion of ISA dated Oct. 25, 2011 in connection with International Patent Application No. PCT/KR2011/001728.
(Continued)

*Primary Examiner* — Anez Ebrahim (57) ABSTRACT

The present invention relates to a control signaling method and apparatus in a coordinated multi-point (CoMP) system. A base station generates a cell information block (CIB) containing associated cell information of each CoMP base station of the CoMP system, scrambles first control information for the transmission of the CIB using a CoMP-radio network temporary identifier (RNTI) given to the CoMP system, transmits the scrambled control information to terminals in a cell via a control channel, and transmits the CIB to terminals in the cell via a data channel. In addition, when handover to a target cell for a specific terminal from among said terminals is determined, the base station generates second control information for indicating the target cell, scrambles the second control information using a cell RNTI (C-RNTI) of the specific terminal, and transmits the scrambled control information to the specific terminal via the control channel, to thereby indicate cell reselection and/or handover to the target cell.

12 Claims, 6 Drawing Sheets

(51) Int. Cl.
| | |
|---|---|
| *H04B 7/02* | (2006.01) |
| *H04W 36/08* | (2009.01) |
| *H04W 48/08* | (2009.01) |
| *H04W 88/08* | (2009.01) |

(56) References Cited

U.S. PATENT DOCUMENTS

| | | | | |
|---|---|---|---|---|
| 2010/0273514 | A1* | 10/2010 | Koo | H04B 7/024 455/501 |
| 2011/0222501 | A1* | 9/2011 | Kim | H04L 1/0041 370/329 |
| 2011/0256897 | A1* | 10/2011 | Taoka | H04B 7/0615 455/509 |
| 2012/0176891 | A1* | 7/2012 | Chin | H04W 36/0055 370/221 |

OTHER PUBLICATIONS

R1-101176, Discussion on open-loop CoMP scheme, 3GPP TSG RAN WG1 #60,San Francisco, California, Feb. 22-26, 2010, 3 pages.
R1-101648, TP for 3GPP TR 36.814 on CoMP, 3GPP TSG RAN WG1 #60, San Francisco, California, Feb. 22-26, 2010, 6 pages.
R1-101178, Scrambling sequence for CoMP, 3GPP TSG RAN WG1 #60, San Francisco, California, Feb. 22-26, 2010, 3 pages.
R1-101220, Investigation on Quantization Scheme on Explicit Spatial Channel Feedback for CoMP Joint Transmission in LTE-Advanced, 3GPP TSG RAN WG1 #60, San Francisco, California, Feb. 22-26, 2010, 8 pages.
RP-090737 TR 36.912 v2.2.0, 3GPP Release 9, Feasibility study for Further Advancements for E-UTRA (LTE-Advanced), Sep. 2009, 52 pages.
3GPP TR 36. 913 V1.0.0, Requirements for Further Advancements for E-UTRA (LTE-Advanced), May 2008, 13 pages.
S. Parkvall, and D. Astely, "The Evolution of LTE toward IMT-Advanced", Journal of Communications, vol. 4, No. 3, pp. 146-154, Apr. 2009.
G. J. Foschini, K. Karakayali, and R. A. Valenzuela, "Coordinating multiple antenna cellular networks to achieve enormous spectral efficiency," IEE Proc.-Commun., vol. 153, No. 4, pp. 548-555, Aug. 2006.
R1-090793 , Motorola, "Coordinated Multi-Point Transmission—Coordinated Beamforming and Results", Feb. 9-13, 2009, 4 pages.
R1-091263, Huawei, "CoMP Coordinated Scheduling for LTE-Advanced", Seoul, Republic of Korea, Mar. 23-27, 2009, 7 pages.
R1-084252, NTT Docomo, Views on Coordinated Multipoint Transmission/Reception in LTE-Advanced, Prague, Czech Republic, Nov. 10-14, 2008, 7 pages.
R1-084203, LG Electronics, "Consideration on CoMP in LTE-Advanced", Prague, Czech Republic, Nov. 10-14, 2008, 5 pages.
R1-084400, Qualcomm Europe, "Coordinated Multi-Point downlink transmission in LTE-Advanced", Prague, Czech Republic, Nov. 10-15, 2008, 5 pages.

* cited by examiner

DCI FORMAT 1C (SI-RNTI)

| Gap value | RB assignment | Transport Block size |
|---|---|---|

FIG.3A

DCI FORMAT 1C (SI-RNTI)

| CoMP cell index | Padding |
|---|---|

CONTROL SIGNALING METHOD AND APPARATUS IN A COORDINATED MULTI-POINT SYSTEM

CROSS-REFERENCE TO RELATED APPLICATION(S)

The present application claims priority under 35 U.S.C. §365 to International Patent Application No. PCT/KR2011/001728 filed Mar. 12, 2011, entitled "CONTROL SIGNALING METHOD AND APPARATUS IN A COORDINATED MULTI-POINT SYSTEM". International Patent Application No. PCT/KR2011/001728 claims priority under 35 U.S.C. §365 and/or 35 U.S.C. §119(a) to Korean Patent Application No. 10-2010-0022328 filed Mar. 12, 2010 and which are incorporated herein by reference into the present disclosure as if fully set forth herein.

TECHNICAL FIELD

The present invention relates to a Coordinated Multi-Point (CoMP) system, and more particularly, to a method and an apparatus for performing a DownLink (DL) control signaling for a high-speed cell selection.

BACKGROUND ART

A wireless cellular communication system divides entire service areas into a plurality of cells covered by a plurality of node Bs (NBs), and provides users with a wireless communication service by connecting an air interface between each node B and each User Equipment (UE) within a corresponding cell. The air interface is connected based on radio resources, and the radio resources may be configured by a time domain, a frequency domain, or a two-dimensional domain including time and frequency domains. Particularly, an Orthogonal Frequency Division Multiple Access (OFDMA) cellular system configures whole radio resources as the two-dimensional domain including the frequency and time domains, and uses a technique of dividing and allocating the radio resources according to a channel condition and a user characteristic.

The wireless communication system has been developed in a form of providing users with various high speed high capacity services, and accordingly various techniques have been proposed. A Coordinated Multi-Point (CoMP) system is considered in several systems including a 3$^{rd}$ Generation Partnership Project Long Term Evolution-Advanced (3GPP LTE-A) system as a means for expanding a service area providing a high speed data rate and increasing a cell edge throughput and/or a system throughput.

In various communication systems including the LTE-A system, Coordinated Scheduling (CS), Coordinated Beamforming (CB), Joint Precoding (JP) and the like are researched as a downlink COMP technology. Decreasing a cell (re)selection delay or a handover interrupt time in the communication system is an important issue, and an improvement on a handover delay which may be generated by applying the researched element technology is required.

DISCLOSURE

Technical Problem

The present invention provides a method and an apparatus for more efficiently receiving adjacent cell information from eNBs in a radio cellular communication system.

The present invention provides a method and an apparatus for a DownLink (DL) control signaling for reducing a cell (re)selection and/or a handover delay in the radio cellular communication system.

The present invention provides a method and an apparatus for supporting a high-speed cell (re)selection and/or a high-speed handover through a dedicated control channel in a CoMP system.

The present invention provides a method and an apparatus for performing a high-speed cell (re)selection and/or a high-speed handover without a signaling delay between an eNB and a user equipment in the CoMP system.

Technical Solution

In accordance with an aspect of the present invention, there is provided a method of performing a control signaling by an eNB in a Coordinated Multi-Point (CoMP) system, the method including: generating a Cell Information Block (CIB) containing associated cell information on each CoMP eNB included in the CoMP system and first control information for transmission of the CIB; scrambling the first control information with a CoMP Radio Network Temporary Identifier (RNTI) assigned to the CoMP system and transmitting the scrambled first control information to user equipments within a cell through a control channel; and transmitting the CIB to the user equipments within the cell through a data channel.

In accordance with another aspect of the present invention, there is provided a method of performing a control signaling by a user equipment in a Coordinated Multi-Point (CoMP) system, the method including: receiving first control information scrambled using a CoMP Radio Network Temporary Identifier (RNTI) assigned to the CoMP system through a control channel; receiving Cell Information Block (CIB) containing associated cell information on each of CoMP eNBs included in the CoMP system through a data channel based on the first control information; and storing the associated cell information contained in the CIB to refer to the associated cell information in a handover procedure.

In accordance with another aspect of the present invention, there is provided an eNB apparatus for a control signaling in a coordinated Multi-Point (CoMP) system, the eNB apparatus including: a controller for generating a Cell Information Block (CIB) containing associated cell information on each of CoMP eNBs included in the CoMP system and generating first control information for transmission of the CIB; and a transceiver for scrambling the first control information with a CoMP Radio Network Temporary Identifier (RNTI) assigned to the CoMP system, transmitting the scrambled first control information to user equipments within a cell through a control channel, and transmitting the CIB to the user equipments within the cell through a data channel.

In accordance with another aspect of the present invention, there is provided a user equipment apparatus for a control signaling in a Coordinated Multi-Point (CoMP) system, the user equipment apparatus including: a transceiver for receiving first control information scrambled using a CoMP Radio Network Temporary Identifier (RNTI) assigned to the CoMP system through a control channel, and receiving a Cell Information Block (CIB) containing associated cell information on each of CoMP eNBs included in the CoMP system through a data channel based on the first control information; and a controller for analyzing the first control information and the CIB, and storing the associated cell information contained in the CIB in a memory to refer to the associated cell information in a handover procedure.

Advantageous Effects

According to the present invention, a physical layer of the user equipment can directly initiate an access procedure to a target eNB without an instruction from a higher layer and reception of a configuration parameter by transmitting, in advance, a CIB containing adjacent cell information for the CoMP system by using a particular RNTI. Further, according to the present invention, it is possible to more rapidly perform the cell (re)selection/HO procedure of the user equipment without decoding of a data channel and a processing delay of the higher layer by using control information on a particular format indicating the cell (re)selection and/or handover (HO) procedure to the target cell.

MODE FOR CARRYING OUT THE INVENTION

Hereinafter, exemplary embodiments of the present invention will be described in detail with reference to the accompanying drawings. In the following description, only parts necessary for understanding of operations of the present invention are described and other background arts will be omitted not to make the subject matter of the present invention unclear.

A control signaling operation in a radio cellular communication system will be described herein with reference to a communication standard based on 3GPP LTE-A. However, a feedback operation according to the present invention is not limited to a particular communication protocol or system configuration, and it will be apparent to those skilled in the art that various modifications can be made without departing from the scope of the present invention. Specifically, embodiments of the present invention which will be described below are applicable to a case where the downlink control signaling is provided in the CoMP system.

Figure 1:
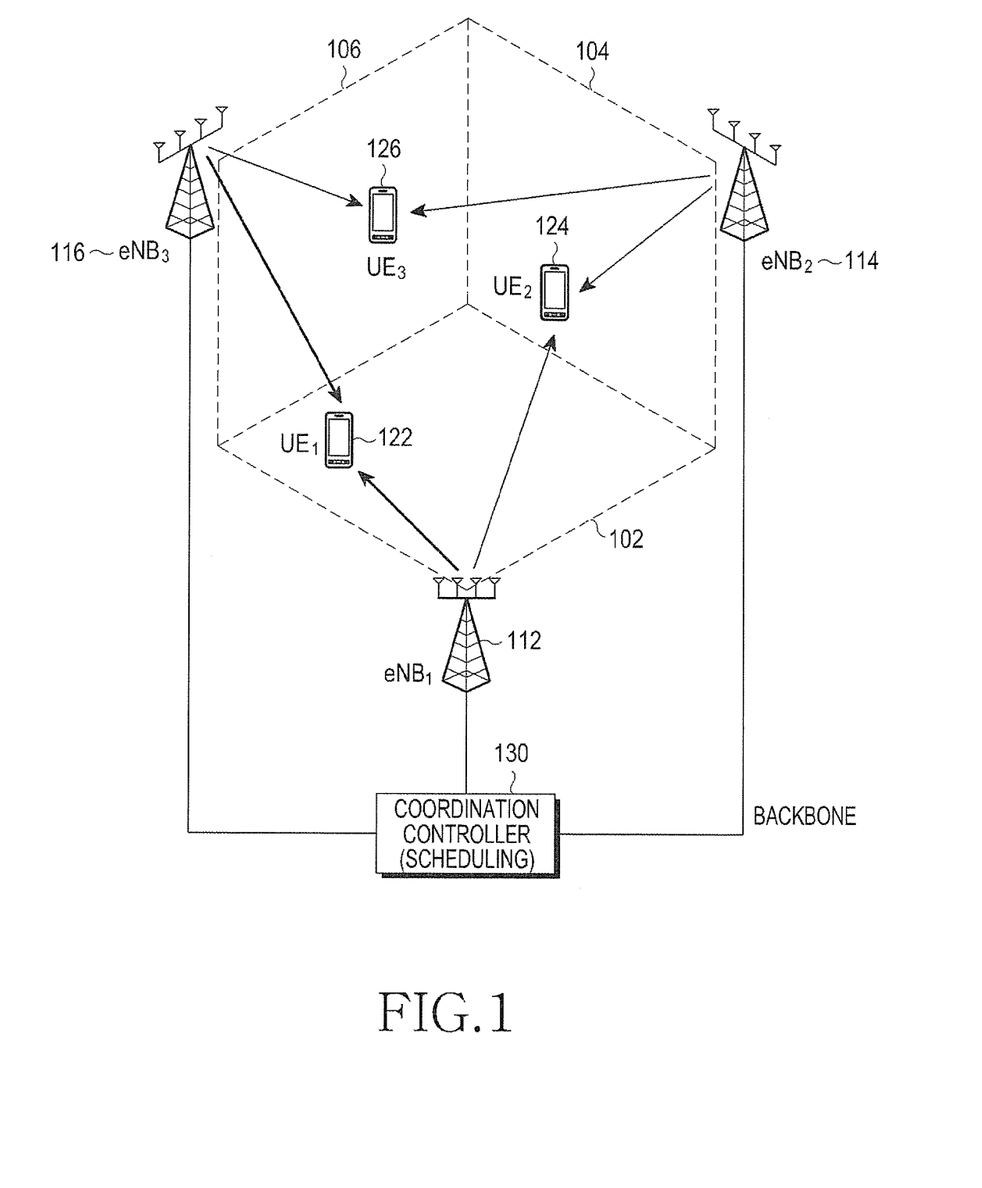
FIG. 1 is a diagram illustrating a cell structure of a CoMP communication system according to an exemplary embodiment of the present invention.

FIG. 1 is a diagram illustrating a cell structure of a CoMP communication system according to an exemplary embodiment of the present invention.

As shown in FIG. 1, a plurality of eNBs 112, 114, and 116 connect an air interface with user equipments 122, 124, and 126 within cells 102, 104, and 106 of respective eNBs through one or a plurality of transmission/reception antennas, and provide a service. Here, for convenience of the description, only some of the service areas, not all cells of the eNBs 112, 114, and 116 are illustrated. The plurality of eNBs 112, 114, and 116 in a multi-cell environment configure one cluster, that is, a multi-point group through coordination. The eNBs 112, 114, and 116 with the multi-point group are referred to as coordinated-points or CoMP eNBs, and connected to a higher device called a coordination controller or a coordinator 130 through a backbone.

The coordination controller 130 is arranged in a particular eNB within a multi-point group, for example, in a serving eNB, or may be implemented as a separate system, and in charge of Coordinated Scheduling (CS), Coordinated Beamforming (CB), Joint Precoding (JP) and the like for all the coordinated eNBs 112, 114, and 116 within the multi-point. Further, the coordination controller 130 manages a mobility of a user equipment moving between cells, and determines and instructs a cell reselection for a movement of a user equipment, which is not in an access state, between cells and/or a handover for a movement of a user equipment, which is in an access state. Hereinafter, although the "cell reselection" will be described in embodiments of the present invention for convenience of the description, the present invention can be applied to the "cell selection" as well as the "cell reselection" as described above.

In the cellular communication system, a command for the cell reselection, the handover or the like is instructed through a higher layer signaling. The command is transferred through a Dedicated Broadcast Channel (DBCH) corresponding to a logical channel, and the DBCH is mapped to a Physical Dedicated Shared Channel (PDSCH). The user equipment is required to first decode a Physical Dedicated control Channel (PDCCH) including Radio Bearer (RB) allocation information, a Modulation and coding Scheme (MCS), a Transport Block Size (TBS), other necessary information and the like in order to decode data of the PDSCH. A physical layer of the user equipment decodes the PDSCH data and transfers the PDSCH data to a higher layer. Then, the higher layer of the user equipment analyzes the PDSCH data, and prepares a cell (re)selection or handover procedure when the PDSCH data includes the cell reselection or handover command as a result of the analysis.

The PDCCH supports various formats to transmit Downlink control Information (DCI). The DCI formats are involved in DCI transmission. For example, a DCI format 0 may be used for transporting an uplink scheduling grant, a DCI format 1/1A may be used for allocating a downlink shared channel resource when a spatial multiplexing is not used, a DCI format 2/2A may be used for allocating the downlink shared channel resource when a closed loop or open loop spatial multiplexing is used, and a DCI format 3/3A may be used for transporting a Transmit Power Control (TPC) command for uplink. The DCI formats are not limited to the above listed examples, and the PDCCH may be variously operated according to a selection by a system designer or a network operator.

Further, the PDCCH includes a Radio Network Temporary Identifier (RNTI) for identifying a corresponding user equipment independently from the DCI formats. The user equipment is allocated its inherent RNTI within a current cell to use the PDCCH, and the RNTI is referred to as a Cell-RNTI (C-RNTI). Besides, a group RNTI, a System Information RNTI (SI-RNTI), a Random Access RNTI (RA-RNTI) and the like may be used according to utilization purposes and the like. For example, in a case of a PDCCH for a particular user equipment, the DCI can be scrambled using the C-RNIT of the user equipment. Alternatively, in a case of a PDCCH for indicating a random access response in response to random access preamble transmission of the user equipment, the DCI can be scrambled using the RA-RNTI.

When the C-RNTI is used, the PDCCH transports the DCI for a corresponding particular user equipment. When another RNTI is used, the PDCCH transports a common DCI for one or more user equipments within the cell.

The user equipment identifies RNTIs applied to PDCCH information by individually decoding (that is, blind detection) information received through the PDCCH by applying each of a plurality of already known RNITs, and identifying whether there is an error in each result of decoding. When the decoding result by a particular RNTI is successful as a result of the blind detection, the user equipment determines that the PDCCH is decoded by the RNTI and analyzes the corresponding decoding result.

Figure 2:
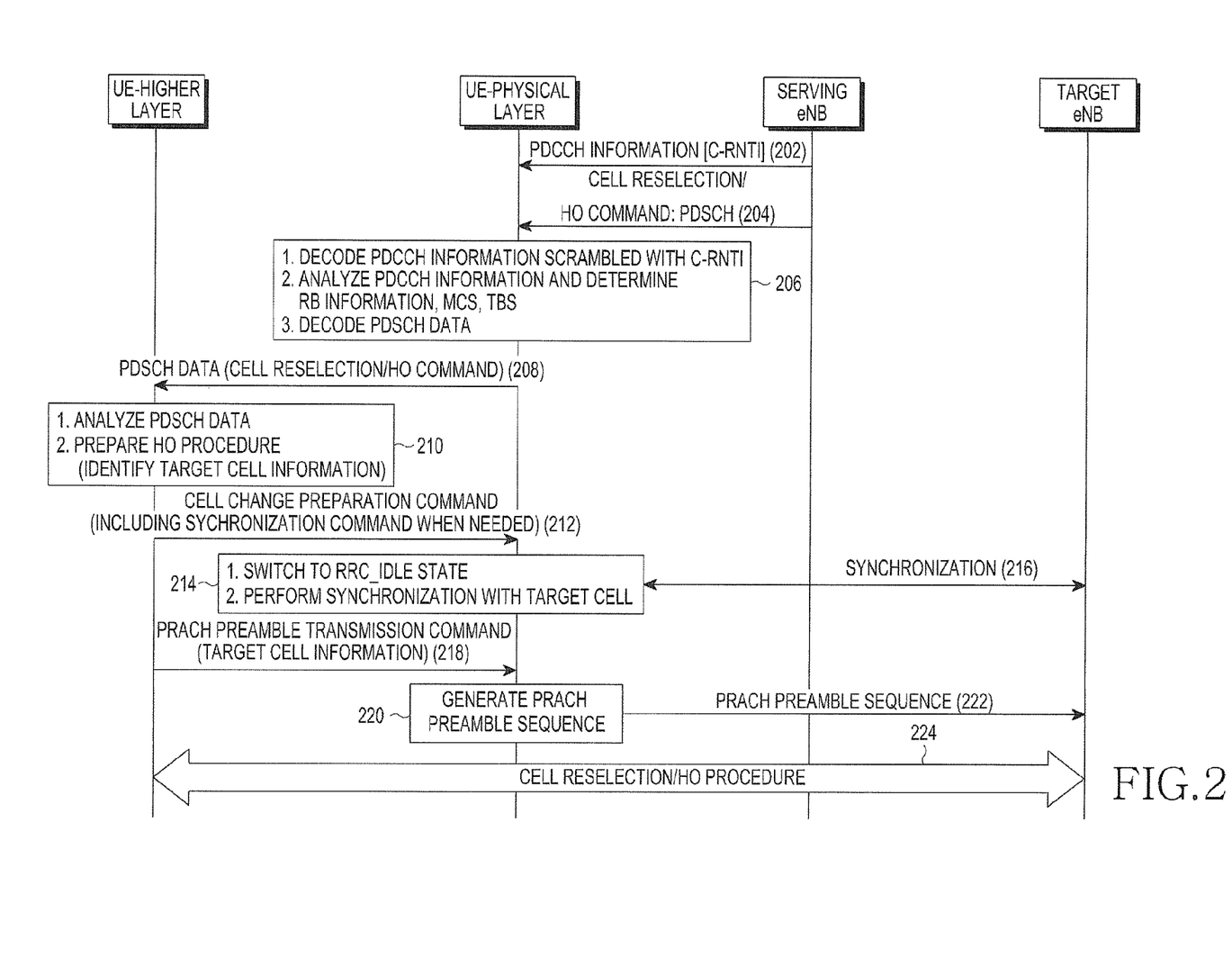
FIG. 2 is a message flowchart illustrating a downlink control signaling according to an embodiment of the present invention.

FIG. 2 is a message flowchart illustrating a downlink control signaling according to an embodiment of the present invention. Here, a control signaling for performing a cell reselection or a handover (HO) from a serving eNB to a target eNB is illustrated. Here, the user equipment receives cell information on adjacent cells from the serving eNB through the PDSCH in advance and stores the received cell information.

Referring to FIG. 2, the serving eNB transmits information scrambled with a corresponding C-RNTI to the user equipment within the cell through the PDCCH in step 202, and transmits data containing a cell reselection/HO command through the PDSCH in step 204. Information on the PDCCH contains a DCI required for decoding the PDSCH. A physical layer of the user equipment decodes information received through the PDCCH by using its own C-RNTI, and determines RB allocation information, MCS, TBS and the like related to the PDSCH according to the decoding result in step 206. Thereafter, the physical layer decodes the PDSCH by using control information obtained through the PDCCH.

The physical layer of the user equipment transfers PDSCH data obtained by decoding the PDSCH to the higher layer in step 208. The higher layer of the user equipment analyzes the PDSCH data to recognize that the PDSCH data contains the cell reselection/HO command, and identifies target cell information on a corresponding target cell, that is, a cell index from the adjacent cell information pre-received and stored to prepare the cell reselection or HO procedure in step 210. The higher layer of the user equipment transfers a cell change preparation command to the physical layer in step 212. Here, the cell change preparation command contains an instruction of a synchronization with the target cell if necessary.

The physical layer of the user equipment switches to a Radio Resource Control IDLE (RRC_IDLE) state in response to the cell change preparation command in step 214, and performs the synchronization with the target cell when instructed in step 216.

Meanwhile, the higher layer of the user equipment instructs the physical layer to transmit a Physical Random Access Channel (PRACH) preamble required for an initial access to the target cell in step 218. The command is transferred to the physical layer, including configuration parameters required for generating a PRACH preamble sequence corresponding to the target cell. Then, the physical layer generates the PRACH preamble sequence corresponding to the target cell with reference to the parameters in step 220, and attempts an initial access by transmitting the PRACH preamble sequence to the target cell in step 222. Thereafter, when the target eNB successfully receives the PRACH preamble sequence, the remaining operations of the cell reselection/HO procedure are performed in step 224.

In order to perform the cell reselection/HO procedure by the user equipment in the signaling procedure shown in FIG. 2, there is required a plurality of signal exchanges between the physical layer and the higher layer. Such a signal exchange may cause a delay of the cell reselection/HO procedure to finally deteriorate a phone communication quality.

In exemplary embodiments of the present invention to prevent the above problems, control information related to a Cell Information Block (CIB) for each CoMP cell included in a CoMP cluster, that is, each CoMP eNB and control information indicating a cell reselection/HO command are transmitted using a particular DCI and a particular RNTI, respectively, so that it is supported that the physical layer of the user equipment more rapidly performs the cell reselection/HO procedure to the target CoMP eNB.

For a more detailed example, the control information related to the CIB of each CoMP eNB may be transmitted through the DCI format 1A of the PDCCH having a particular RNTI used within the CoMP cluster. This is to distinguish the CIB from a System Information Block (SIB) for cells included in the CoMP cluster. Hereinafter, the RNTI related to the CIB within the CoMP cluster is referred to as a CoMP-RNTI. The CoMP-RNTI may be set as one of FFF4 to FFFD corresponding to values which are not used for other RNTIs, and for example, may be set as FFFD.

Further, the cell reselection/HO command is instructed using a DCI format 1C of the PDCCH and the C-RNTI within the CoMP cluster. This is to indicate that the cell reselection/HO command is a dedicated command for the user equipment. In general, the DCI format 1C of the PDCCH is used for transmitting control information having a relatively small size.

Figure 3A:
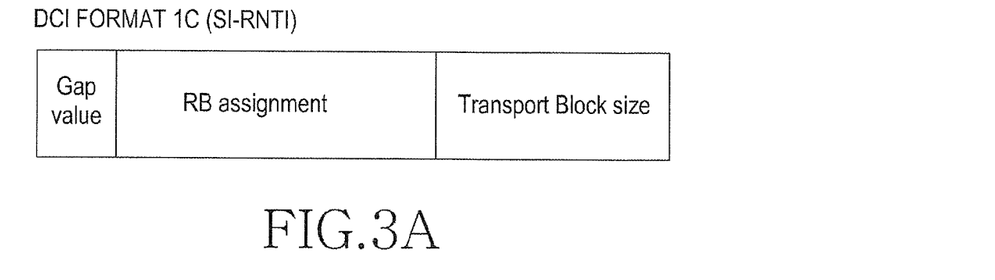
FIGS. 3A and 3B are diagrams illustrating a DCI format 1C of a PDCCH indicating a cell reselection/HO command.
Figure 3B:
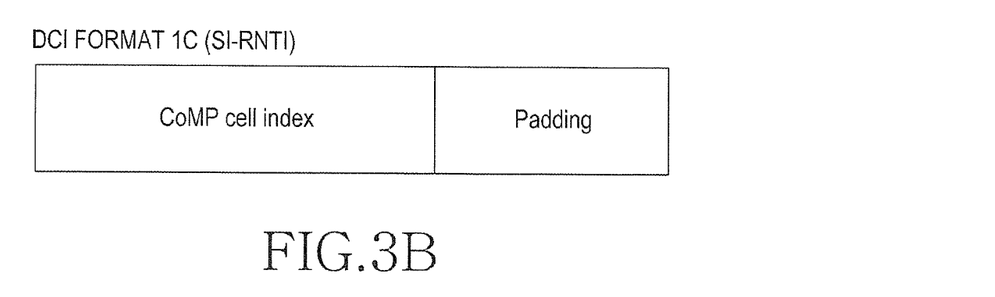

FIG. 3 is a diagram illustrating the DCI format 1C of the PDCCH indicating the cell reselection/HO command. FIG. 3(A) shows the DCI format 1C scrambled with the SI-RNTI, and FIG. 3(B) shows the DCI format 1C scrambled with the C-RNTI. As shown in FIG. 3, the DCI format 1C scrambled with SI-RNTI is general control information, and includes a predetermined gap value, RB allocation information (RB assignment), a Transport Block Size (TBS) and the like. The DCI format 1C scrambled with the C-RNTI according to an exemplary embodiment of the present invention includes a CoMP cell index of the target cell to instruct the cell reselection/HO to the target cell. When the DCI format 1C is scrambled with the C-RNTI, it is preferable that the CoMP cell index has a size equal to or smaller than 8 bits. It is because a minimum size of the DCI format 1C is 8 bits in a case where a bandwidth of 1.4 MHz is used. In general, since a number of CoMP cells in the CoMP system does not exceed 256, the DCI format 1C can be reused for the cell reselection/HO command.

Figure 4:
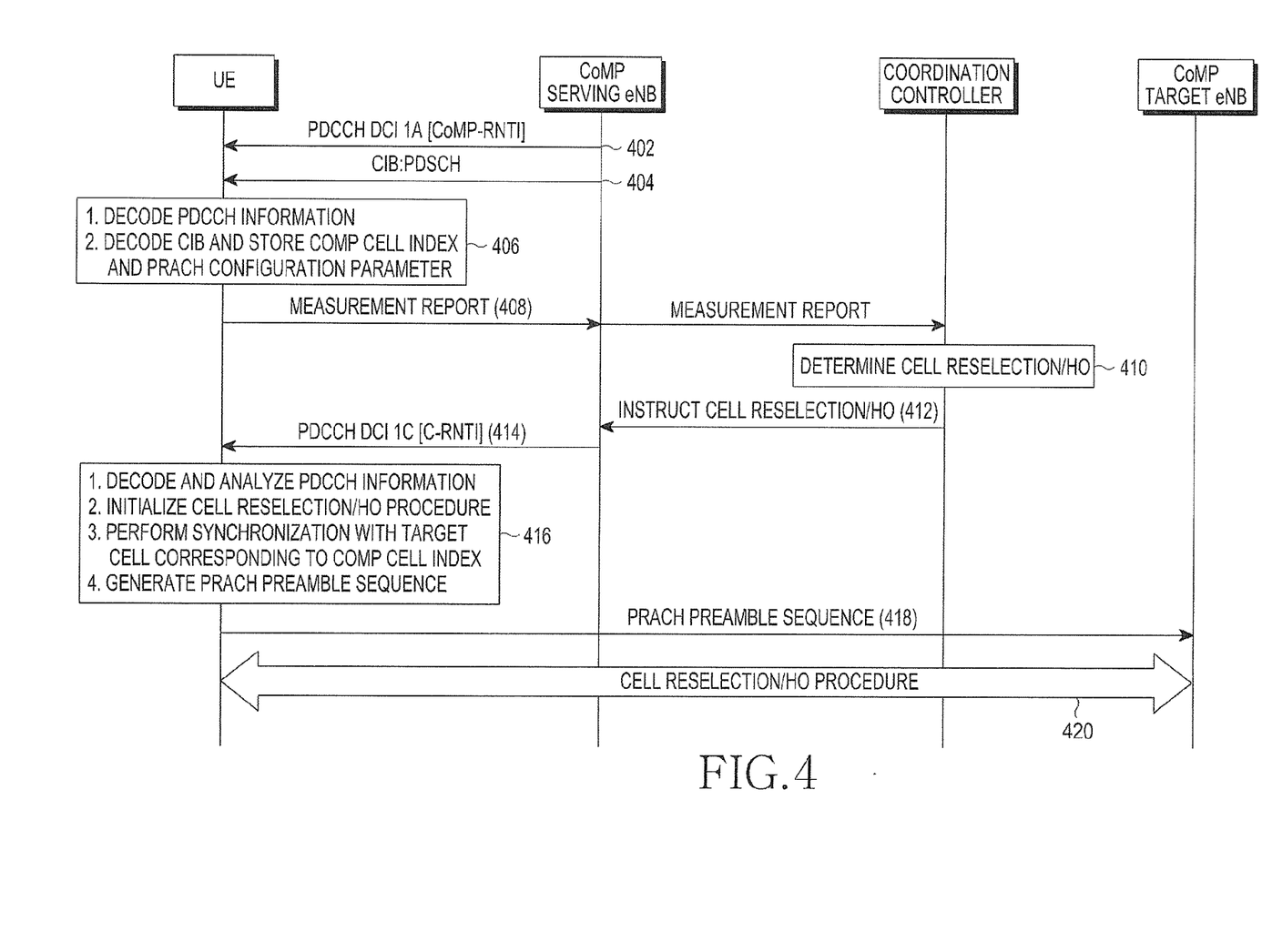
FIG. 4 is a message flowchart illustrating a downlink control signaling according to an exemplary embodiment of the present invention.

FIG. 4 is a message flowchart illustrating a downlink control signaling according to an exemplary embodiment of the present invention. FIG. 4 shows a control signaling in which the user equipment performs the cell reselection or the handover (HO) to the target eNB from the serving eNB included in the CoMP cluster.

Referring to FIG. 4, the CoMP serving eNB transmits control information on the DCI format 1A scrambled with the CoMP-RNTI assigned to a corresponding CoMP cluster to the user equipment within the cell through the PDCCH in step 402, and transmits the CIB containing adjacent cell information on cells included in the CoMP cluster, that is, associated cell information of all CoMP eNBs to the user equipment within the cell through the PDSCH in step 404. Information on the DCI format 1A contains RB information, MCS, TBS and the like required for decoding the PDSCH, and is received by all user equipments located within the cell of the CoMP serving eNB. The physical layer of the user equipment decodes the information received through the PDCCH by using the C-RNTI, and the user equipment determines RB allocation information, MCS, TBS and the like related to the PDSCH according to a result of the decoding in step 406. Thereafter, the physical layer of the user equipment decodes data of the PDSCH by using the information obtained through the PDCCH to acquire the CIB, and extracts and stores associated information of each CoMP eNB contained in the CIB in step 406.

Specifically, the CIB at least contains information on the CoMP cell index related to respective CoMP eNBs included in the CoMP cluster and a PRACH configuration parameter. Here, the CoMP cell index is uniquely assigned to each CoMP eNB within the CoMP cluster. For example, the CIB may contain the CoMP cell index and a mapping table of the cell index. Here, the cell index refers to an identifier uniquely assigned to identify all eNBs within the radio cellular communication system. Since the amount of information on the CIB is increased as a number of CoMP eNBs included in one CoMP cluster is increased, it is required to limit a kind of information contained in the CIB. However, when the number of CoMP eNBs is very small, the CIB can be expanded to contain all kinds of adjacent cell information contained in the SIB.

Meanwhile, the user equipment transmits measurement values for signals received from neighboring eNBs, for example, a measurement report message containing Reference Signal Received Power (RSRP) or Reference Signal Received Quality (RSRQ) to the serving eNB, that is, the CoMP serving eNB periodically or in an event form in step 408. The CoMP serving eNB transfers the measurement report message to the coordination controller. The coordination controller determines whether the user equipment is required to move to the target cell based on the measurement values from the user equipment in step 410. When the user equipment is required to move to the target cell, the coordination controller instructs the CoMP serving eNB to perform the cell reselection/HO for the user equipment in step 412.

The CoMP serving eNB transmits information on the DCI format 1C scrambled with the C-RNTI of the corresponding user equipment according to the instruction of the coordination controller through the PDCCH in step 414. The information on the DCI format 1C indicates the cell reselection/HO by itself, rather than indicates control information on separate PDSCH data. In step 416, the user equipment successfully decodes information received through the PDCCH by using its own C-RNTI, and, when identifying that the information on the PDCCH is the DCI format 1C, the user equipment recognizes that the information on the DCI format 1C indicates the cell reselection/HO and thus directly initiates the cell reselection/HO procedure without an instruction from the higher layer. That is, the physical layer of the user equipment transfers the PDSCH data to the higher layer, and can initiate the cell reselection/HO procedure without waiting for reception of a cell change preparation command according to a processing of the higher layer. When the cell reselection/HO procedure is initiated, the user equipment reads the PRACH configuration parameter of the target cell indicated by the CoMP cell index contained in the information on the DCI format 1C among the cell information pre-stored in step 406, and generates a PRACH preamble sequence based on the PRACH configuration parameter. At this time, the user equipment can perform the synchronization with the target cell when needed.

The user equipment attempts an initial access by transmitting the PRACH preamble sequence to the CoMP target eNB in step 418. Thereafter, when the CoMP target eNB successfully receives the PRACH preamble sequence, the remaining operations of the cell reselection/HO procedure are performed in step 420.

As described above, in the exemplary embodiment of the present invention, the physical layer of the user terminal can directly initiate an access procedure to the target eNB without the instruction from the higher layer and reception of the PRACH configuration parameter by transmitting the CIB containing adjacent cell information for the CoMP system by using the CoMP-RNTI.

Figure 5:
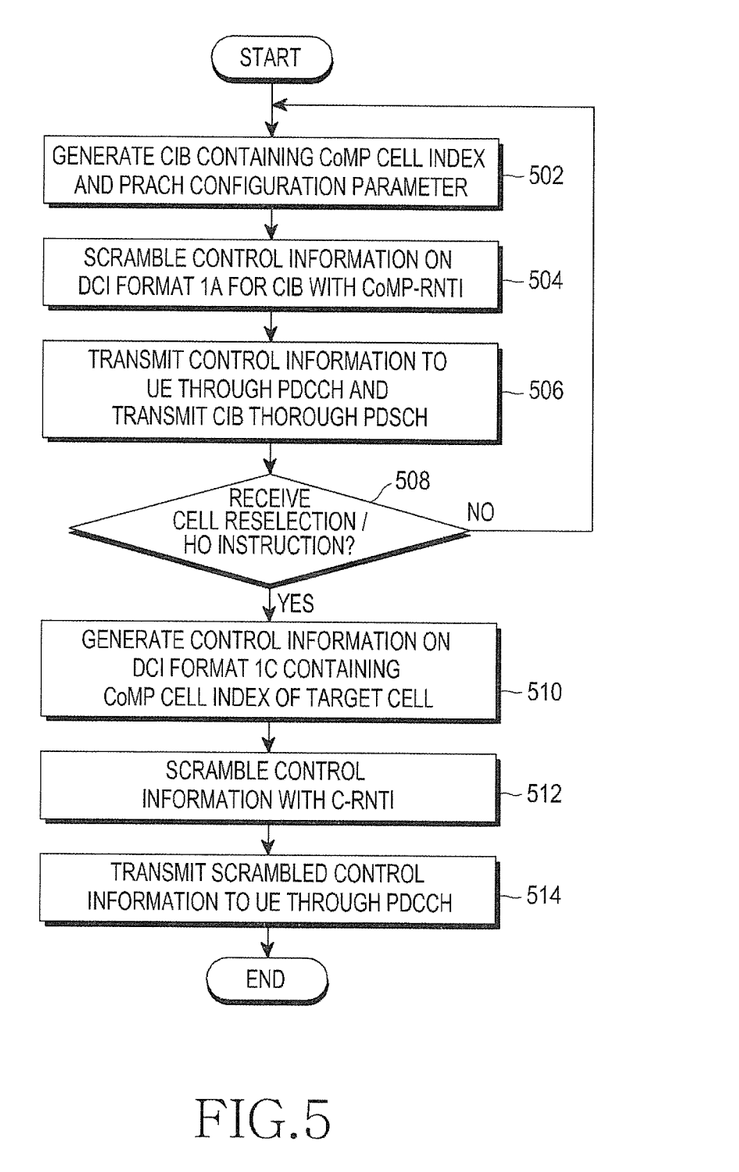
FIG. 5 is a flowchart illustrating an operation of a CoMP eNB according to an exemplary embodiment of the preset invention.

FIG. 5 is a flowchart illustrating an operation of the CoMP eNB according to an exemplary embodiment of the preset invention.

Referring to FIG. 5, the eNB generates the CIB containing information on the CoMP cell index of each CoMP eNB and the PRACH configuration parameter during a predetermined broadcasting period of control information in step 502, and scrambles the control information on the DCI format 1A (that is, DCI 1A) for transmission of the CIB with the CoMP-RNTI in step 504. The eNB broadcasts the scrambled control information to user equipments within the cell through the PDCCH, and also broadcasts the CIB to the user equipments within the cell according to a transmission format based on the control information through the PDSCH in step 506. Although not illustrated, when the measurement report message is received from one of the user equipments, the eNB transfers the measurement report message to the coordination controller.

The eNB determines whether an instruction of the cell reselection/HO is received from the coordination controller in step 508. When there is no received instruction of the cell reselection/HO, the eNB returns to step 502 to broadcast the control information for a next period. In contrast, when there is the instruction of the cell reselection/HO to the target cell for a particular user equipment, the eNB generates control information on the DCI format 1C containing the CoMP cell index of the target cell in step 510, and scrambles the control information with the C-RNTI of the user equipment in step 512. Next, the eNB instructs the user equipment to perform the cell reselection/HO procedure to the target cell by transmitting the control information through resources allocated to the PDCCH in step 514.

Figure 6:
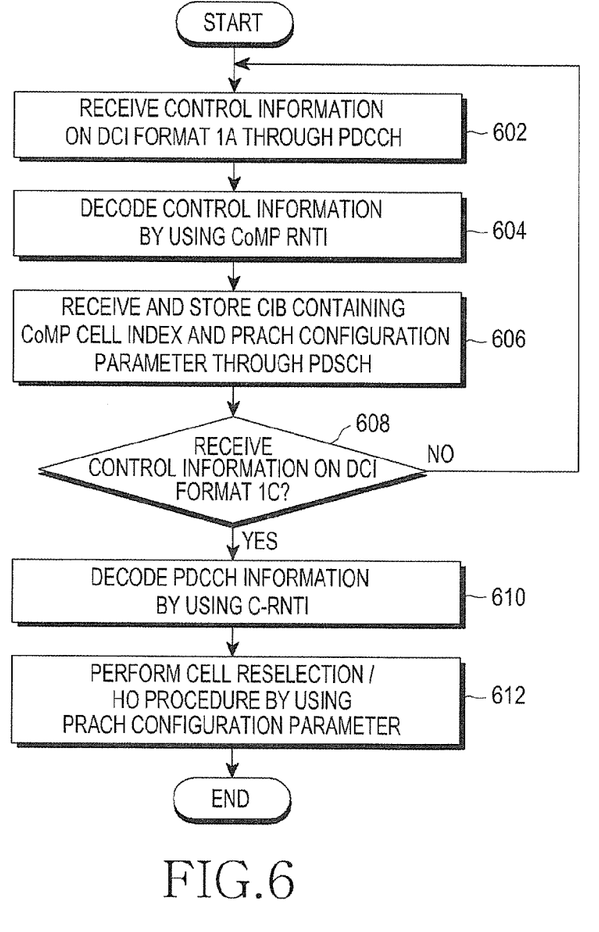
FIG. 6 is a flowchart illustrating an operation of a user equipment according to an exemplary embodiment of the present invention.

FIG. 6 is a flowchart illustrating an operation of the user equipment according to an exemplary embodiment of the present invention.

Referring to FIG. 6, the user equipment receives control information on the DCI format 1A from the eNB through the PDCCH during a predetermined broadcasting period of the control information in step 602, and descrambles and decodes the control information by using the CoMP-RNTI in step 604. The user equipment receives data containing the CIB through the PDSCH with reference to the control information obtained as a result of the descrambling and stores the CIB in step 606. Here, the CIB contains information on the CoMP cell index of each CoMP eNB and the PRACH configuration parameter.

The user equipment determines whether the control information on the DCI format 1C is received from the eNB through the PDCCH in step 608. When the control information on the DCI format 1C is not received, the user equipment returns to step 602 to receive the control information during a next period. In contrast, when the control information on the DCI format 1C is received, the user equipment descrambles and decodes the control information by using its own C-RNTI in step 610. Here, when the user equipment successfully decodes the control information on the DCI format 1C by using the C-RNTI, the user equipment recognizes that the cell reselection/HO to the target cell corresponding to the CoMP cell index contained in the control information is instructed. Accordingly, the user equipment performs the cell reselection/HO procedure by using the PRACH configuration parameter corresponding to the CoMP cell index among the cell information pre-stored in step 606 in step 612.

Figure 7:
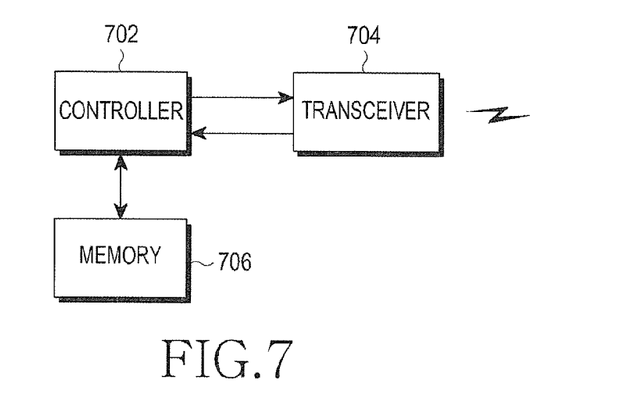
FIG. 7 is a block diagram illustrating a functional structure of an eNB or a user equipment according to an exemplary embodiment of the present invention.

FIG. 7 is a block diagram illustrating a functional structure of the eNB or the user equipment according to an exemplary embodiment of the present invention.

When operating as the eNB, a controller 702 generates the CIB containing information on the CoMP cell index of each CoMP eNB (for example, mapping table of the CoMP cell index and a cell identifier) and the PRACH configuration parameter, and control information on the CIB, and broadcasts the generated CIB and control information to all user equipments within the cell through a transceiver 704. Thereafter, when the coordination controller instructs the cell reselection/HO for a particular user equipment, the controller 702 generates control information on the DCI format 1C scrambled with the C-RNTI and instructs to initiate the cell reselection/HO procedure by transmitting the generated control information to the particular user equipment. To this end, a memory 706 stores parameters and program codes required for generating the CIB and the control information.

When operating as the user equipment, the controller 702 performs a control action of the physical layer, receives the CIB containing information on the CoMP cell index of each CoMP eNB (for example, mapping table of the CoMP cell index and a cell identifier) and the PRACH configuration parameter from the eNB through the transceiver 704 during a predetermined broadcasting period, and stores the received CIB in the memory 706. Thereafter, when the eNB instructs control information on the DCI format 1C scrambled with the C-RNTI through the transceiver 704, the controller 702 performs the cell reselection/HO procedure to the corresponding target cell in response to the control information. Specifically, the controller 702 refers to the PRACH configuration parameter stored in the memory 706.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method to perform a control signaling by a user equipment in a coordinated multi-point (CoMP) system, the method comprising:
receiving first control information scrambled using a CoMP radio network temporary identifier (RNTI) assigned to the CoMP system;
receiving, through a data channel decoded by the user equipment using the first control information, a cell information block (CIB), generated by a CoMP enhanced node b (eNB) of a plurality of CoMP eNBs in the CoMP system, containing associated cell information on each of the plurality of CoMP eNBs included in the CoMP system;
storing the associated cell information contained in the CIB to refer to the associated cell information in a handover procedure;
receiving second control information that is scrambled using a cell RNTI (C-RNTI) of the user equipment and that indicates a target cell for the handover procedure; and
performing the handover procedure to the target cell based on the second control information,
wherein the user equipment communicates with the plurality of CoMP eNBs and the plurality of CoMP eNBs is scheduled to communicate with the user equipment by the CoMP eNB, and
wherein the second control information contains a CoMP cell index to identify the target cell within the CoMP system.

2. The method as claimed in claim 1, wherein the CIB contains information on a CoMP cell index to identify each of the plurality of CoMP eNBs within the CoMP system and a physical random access channel (PRACH) configuration parameter used to initially access each of the plurality of CoMP eNBs.

3. The method as claimed in claim 1, wherein the CIB contains a CoMP cell index to identify each of the plurality of CoMP eNBs within the CoMP system, a mapping table of a cell identifier to identify each of the plurality of CoMP eNBs in an entire radio cellular system, and a Physical Random Access Channel (PRACH) configuration parameter used to initially access each of the plurality of CoMP eNBs.

4. The method as claimed in claim 1, wherein the first control information is transmitted using downlink control information (DCI) format 1A of the control channel.

5. The method as claimed in claim 1, wherein the second control information is transmitted using downlink control information (DCI) format 1C.

6. The method as claimed in claim 1, wherein performing the handover procedure comprises:
generating a PRACH preamble sequence for the target cell based on the CIB; and
transmitting the PRACH preamble sequence to a target eNB of the target cell.

7. A user equipment apparatus to perform control signaling in a coordinated multi-point (CoMP) system, the user equipment apparatus comprising:
a transceiver configured to receive first control information scrambled using a CoMP radio network temporary identifier (RNTI) assigned to the CoMP system, and receive, through a data channel based on the first control information, a cell information block (CIB), generated by a CoMP enhanced node b (eNB) of a plurality of CoMP eNBs in the CoMP system, containing associated cell information of each of the plurality of CoMP eNB included in the CoMP system; and
a controller configured to analyze the first control information and the CIB, store the associated cell information contained in the CIB in a memory to refer to the associated cell information in a handover procedure, and decode the data channel using the first control information to receive the CIB,
wherein the user equipment communicates with the plurality of the CoMP eNBs and the plurality of CoMP eNBs is scheduled to communicate with the user equipment by the CoMP eNB, wherein the transceiver is configured to receive second control information that indicates a target cell for the handover procedure and that is scrambled using a cell RNTI (C-RNTI) of the user equipment, and the controller is configured to perform the handover procedure to the target cell based on the second control information, and wherein the second control information contains a CoMP cell index to identify the target cell within the CoMP system.

8. The user equipment apparatus as claimed in claim 7, wherein the CIB contains information on a CoMP cell index to identify each of the plurality of CoMP eNBs within the CoMP system and a physical random access channel (PRACH) configuration parameter used to initially access each of the plurality of CoMP eNBs.

9. The user equipment apparatus as claimed in claim 7, wherein the CIB contains a CoMP cell index to identify each of the plurality of CoMP eNBs within the CoMP system, a mapping table of a cell identifier to identify each of the plurality of CoMP eNBs in an entire radio cellular system, and a physical random access channel (PRACH) configuration parameter used to initially access each of the plurality of CoMP eNBs.

10. The user equipment apparatus as claimed in claim 7, wherein the first control information is transmitted using downlink control information (DCI) format 1A.

11. The user equipment apparatus as claimed in claim 7, wherein the second control information is transmitted using downlink control information (DCI) format 1C.

12. The user equipment apparatus as claimed in claim 7, wherein the controller is configured to generate a PRACH preamble sequence for the target cell based on the CIB, and the transceiver is configured to transmit the PRACH preamble sequence to a target eNB of the target cell.

* * * * *